(12) United States Patent
Nogami

(10) Patent No.: US 6,729,909 B2
(45) Date of Patent: May 4, 2004

(54) CARD CONNECTOR

(75) Inventor: Daisuke Nogami, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 10/238,674

(22) Filed: Sep. 11, 2002

(65) Prior Publication Data

US 2003/0049970 A1 Mar. 13, 2003

(30) Foreign Application Priority Data

Sep. 11, 2001 (JP) ........................................ 2001-274704

(51) Int. Cl.[7] .............................................. H01R 24/00
(52) U.S. Cl. .................. 439/630; 439/567; 439/946
(58) Field of Search ................................. 439/630, 607, 439/609, 159, 567, 946, 64, 79, 572, 573

(56) References Cited

U.S. PATENT DOCUMENTS

| | | | | |
|---|---|---|---|---|
| 6,068,510 A | * | 5/2000 | Tung .......................... | 439/567 |
| 6,155,877 A | * | 12/2000 | Yu et al. ...................... | 439/607 |
| 6,206,710 B1 | * | 3/2001 | Chen ........................... | 439/159 |
| 6,394,843 B1 | * | 5/2002 | Chang et al. ................ | 439/607 |
| 6,478,630 B1 | * | 11/2002 | Hsu ............................. | 439/680 |
| 6,520,783 B2 | * | 2/2003 | Hsu ............................. | 439/157 |
| 6,558,199 B2 | * | 5/2003 | Oguchi ....................... | 439/630 |
| 2003/0032317 A1 | * | 2/2003 | Ooya et al. | |
| 2003/0064627 A1 | * | 4/2003 | Ooya et al. | |

* cited by examiner

*Primary Examiner*—Dean Reichard
*Assistant Examiner*—Angel R. Estrada
(74) *Attorney, Agent, or Firm*—Kanesaka & Takeuchi

(57) ABSTRACT

A card connector (21) for electrically connecting a card (22) to a circuit board (46), includes a housing (23) having a rear end into or from which the card (22) is inserted or removed, a plurality of terminals (25) provided in the housing, each terminal having a first end connected to a surface of the circuit board (46) and a second end brought into contact with a contact of the card (22), and at least one reinforcing member (27, 65, and 73) installed in a front wall (26 and 64) of the housing (23) within a range between outermost terminals (25) so that the reinforcing member (27, 65 and 73) withstands a force in the forward direction applied to the front wall (26 and 64).

8 Claims, 11 Drawing Sheets

CARD CONNECTOR

BACKGROUND OF THE INVENTION

1. Field of the Invention

The present invention relates to a card connector for electrically connecting a card having a memory and a circuit board.

2. Description of the Related Art

It is a recent trend that an electrical device, such as a portable telephone, is provided with a card connector for a card having a built-in memory. As shown in FIGS. 9–11, such a card connector 1 comprises a housing 3 for accommodating a card 2, a housing cover 4 for covering the housing 3, and a plurality of or nine terminals 5 provided in the housing 3 in parallel to each other. the housing 3 is made of a plastic and comprises a bottom plate 6, a front wall 7 provided at a front end of the bottom plate 6, side walls 8 and 9 provided at side ends of the bottom plate. One of the side walls 9 is provided with a lock member (not shown). The housing cover 4 is made of a metal, and side portions thereof are bent downwardly to cover an outer surface of the side walls 8 and 9 of the housing 3. A front portion 10 of each terminal 5 goes through the front wall 7 and projects from the housing 3 to be soldered to a predetermined surface of the circuit board 11.

When the card 2 is inserted into the housing 3 from a rear end of the housing 3, the card 2 is locked by the lock member with a contact (not shown) of the card 2 being brought into contact with a rear end portion 12 of the terminal 5. When the card 2 is further pushed into the housing 3, the card 2 is released from the lock member and removed from the rear end of the housing 3.

However, when the electronic device with the card 2 therein is dropped and the card 2 is pushed into the housing 3 excessively, a strong force in the forward direction is applied to the front wall 7 and a connection section between the terminal and the circuit board 11, causing the front wall 7 to be broken or the connection section to be peeled off.

SUMMARY OF THE INVENTION

Accordingly, it is an object of the present invention to provide a card connector having a high reliability, in which the breakdown strength of the housing is increased and the connection section between the terminal and the circuit board is not readily peeled off.

According to the present invention, a card connector for electrically connecting a card and a circuit board comprises a housing having a rear end into or from which the card is inserted or removed, a plurality of terminals provided in the housing, each terminal having a first end connected to a surface of the circuit board and a second end brought into contact with a contact of the card, and at least one reinforcing member installed in a front wall of the housing within a range between two outermost terminals so that the reinforcing member withstands a force in the forward direction applied to the front wall.

It is preferred that the first end of the terminals is connected to the circuit board at a connection section in front of the front wall and the reinforcing member is fixed to the circuit board between an inner surface of the front wall and the connection section.

The card connector may further comprises a housing cover for covering the housing and the reinforcing member is installed such that it contacts with the housing cover.

The card connector may further comprise a housing cover for covering the housing and the reinforcing member is installed integrally with the housing cover.

The front wall may have a plurality of through-holes into which the reinforcing member is inserted.

With the above structure, the reinforcing member withstands a force in the forward direction applied to the front wall. Accordingly, when the electronic device with the card is dropped and the card is pushed into the housing excessively, the front wall of the housing is not broken, thus increasing the reliability of the product.

DESCRIPTION OF THE PREFERRED EMBODIMENTS

The embodiments of the invention will now be described with reference to the accompanying drawings. The function of the card connector upon insertion and removal of the card is the same as that of the prior art and its description will be omitted.

Figure 1:
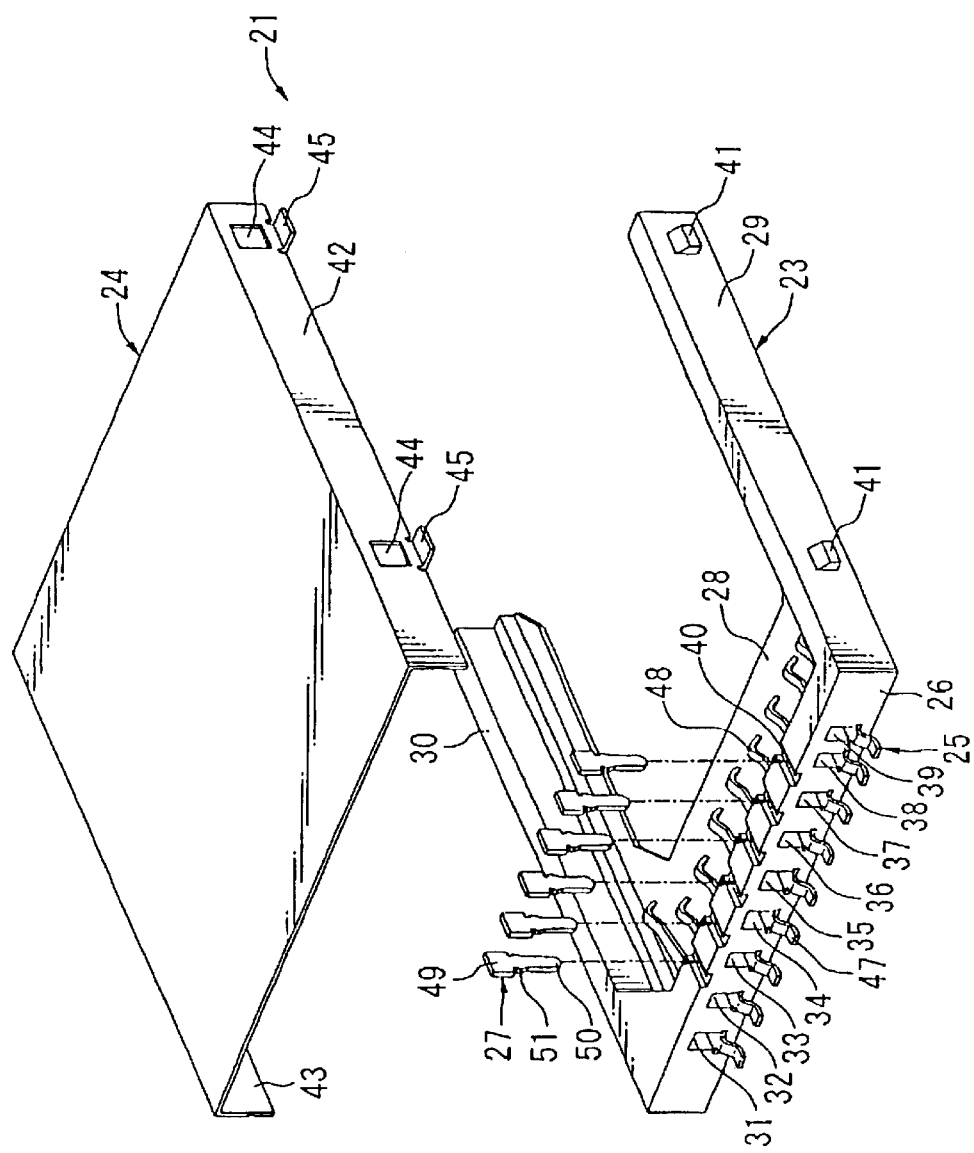
FIG. 1 is an exploded perspective view of a card connector according to the first embodiment of the present invention.
Figure 2:
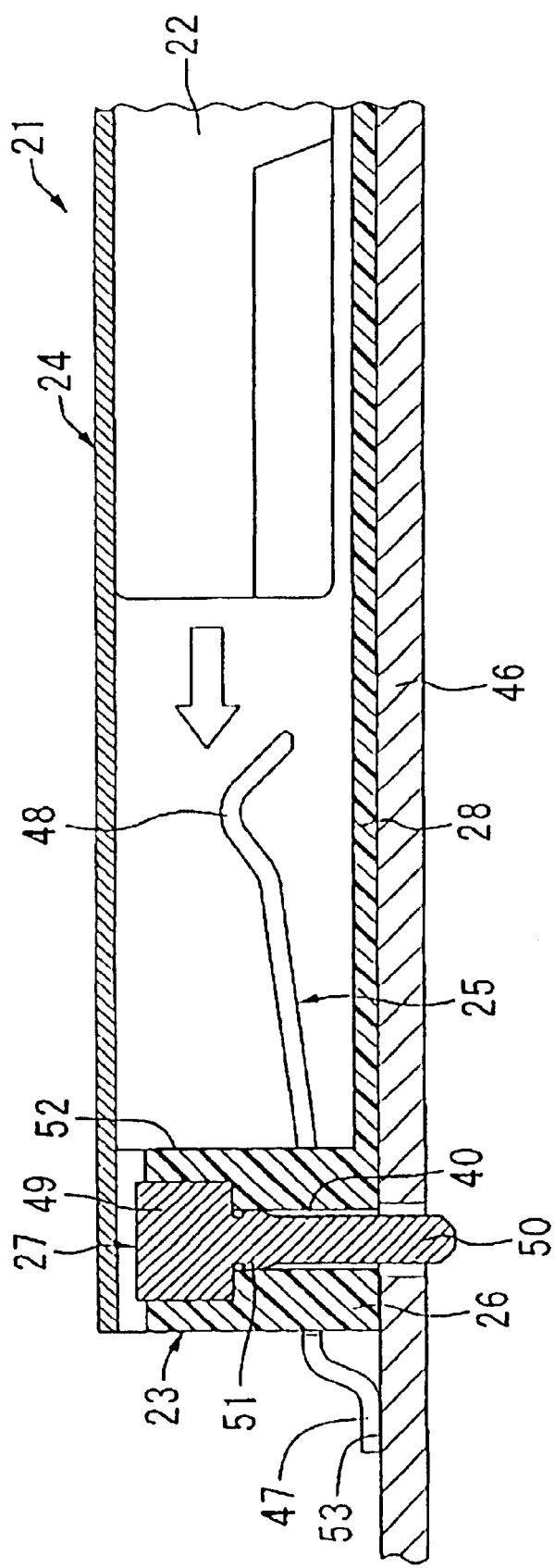
FIG. 2 is a sectional view of a part of the card connector according to the first embodiment of the present invention.

A card connector 21 according to the first embodiment shown in FIGS. 1–2 comprises a housing 23 having a rear end, into or from which a card 22 is inserted or removed, a housing cover 24 for covering the housing, a plurality of terminals 25 (nine in this embodiment) provided in the housing 23, and a plurality of reinforcing metals 27 (six in this embodiment) provided in a front wall 26 of the housing 23.

The housing 23 is made of a plastic and comprises the front wall 26, a U-shaped bottom plate 28, and side walls 29 and 30 provided at side ends of the bottom plate 28. The same number or nine of through-holes 31, 32, 33, 34, 35, 36, 37, 38, and 39 as that of the terminals 25 are provided in the front wall 26 in the back-and-forth direction. Each of a predetermined number or six of slits 40 is provided between the adjacent two through-holes 32, 33, 34, 35, 36, 37, and 38 except for the outermost through-holes 31 and 39. Two engaging projections 41 are provided on the outer surface of each of the side walls 29 and 30.

Side end portions 42 and 43 of the housing cover 24 are bent downwardly to cover the outsides of side walls 29 and 30, respectively. The side end portions 42 and 43 are provided with openings 44 at positions corresponding to the engaging projections 41 so that the housing cover 24 is fixed to the housing 23 by the engagement between the openings 44 and the engaging projections 41. Tabs 45 provided at lower ends of the side end portions 42 and 43 are bent outwardly to be connected to a circuit board 46 so that the housing cover 24 with the housing 23 is fixed to the circuit board 46.

The terminals 25 are press-fitted into the through-holes 31–39 in parallel to each other. A front end 47 of each terminal 25 projects from the housing 23 and is soldered to a predetermined circuit trace of the circuit board 46. A rear end 48 of each terminal 25 is bent so as to be brought into contact with a contact (not shown) of the card 22.

The reinforcing metal 27 is made of a metal and comprises a rectangular head 49 and a leg 50 extending downwardly from the head 49 and having projections 51 on both sides thereof. The reinforcing metal 27 is press-fitted into the slit 40 with the projections 51 and a lower end of the reinforcing metal 27 is soldered to the circuit board 46. The reinforcing metal 27 is positioned within a range between the outermost terminals 25 and soldered to the circuit board 46 between an inner surface 52 of the front wall 26 and a connection section 53, at which the terminal 25 is connected to the circuit board 46. Accordingly, even if the electronic device with the card 22 is dropped and the card is excessively pushed into the housing 23, there is no danger that the front wall 26 is broken or the connection section 53 is peeled off because the forward movement of the card 22 is limited by the reinforcing metal 27.

Figure 3:
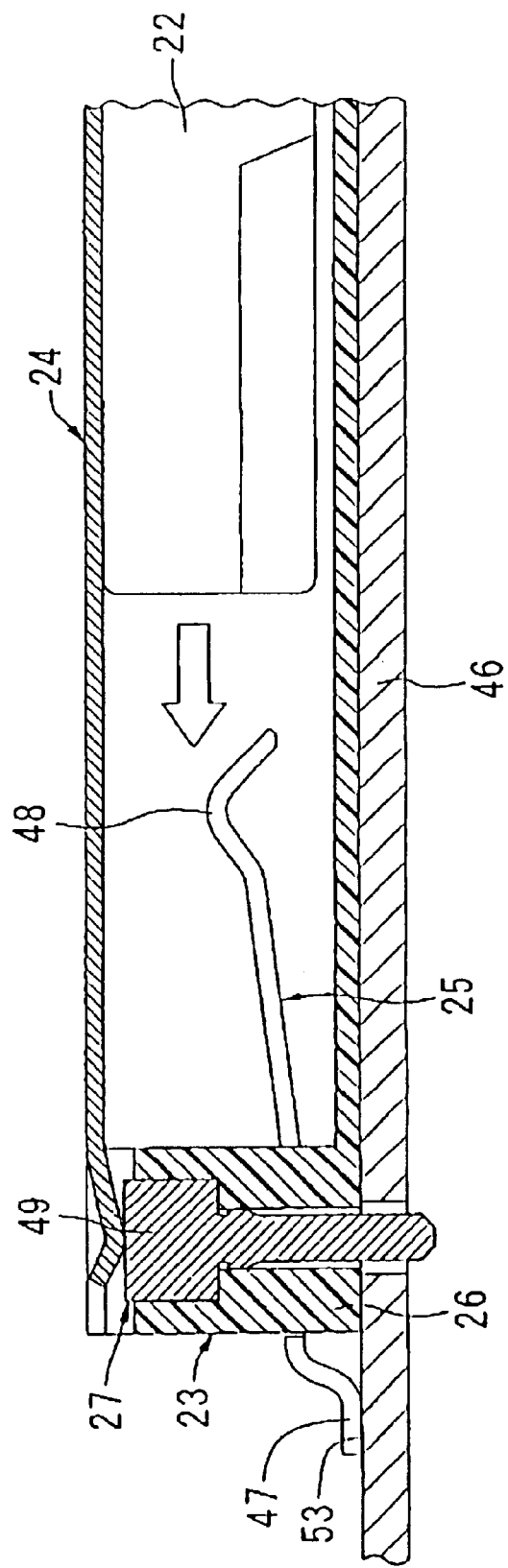
FIG. 3 is a sectional view of a part of the card connector according to a modification of the first embodiment of the present invention.

In FIG. 3, the head 49 of the reinforcing metal 27 contacts with the housing cover 24 to improve the grounding property. The reinforcing metals 27 may be made integral by connecting the heads 49 thereof.

Figure 4:
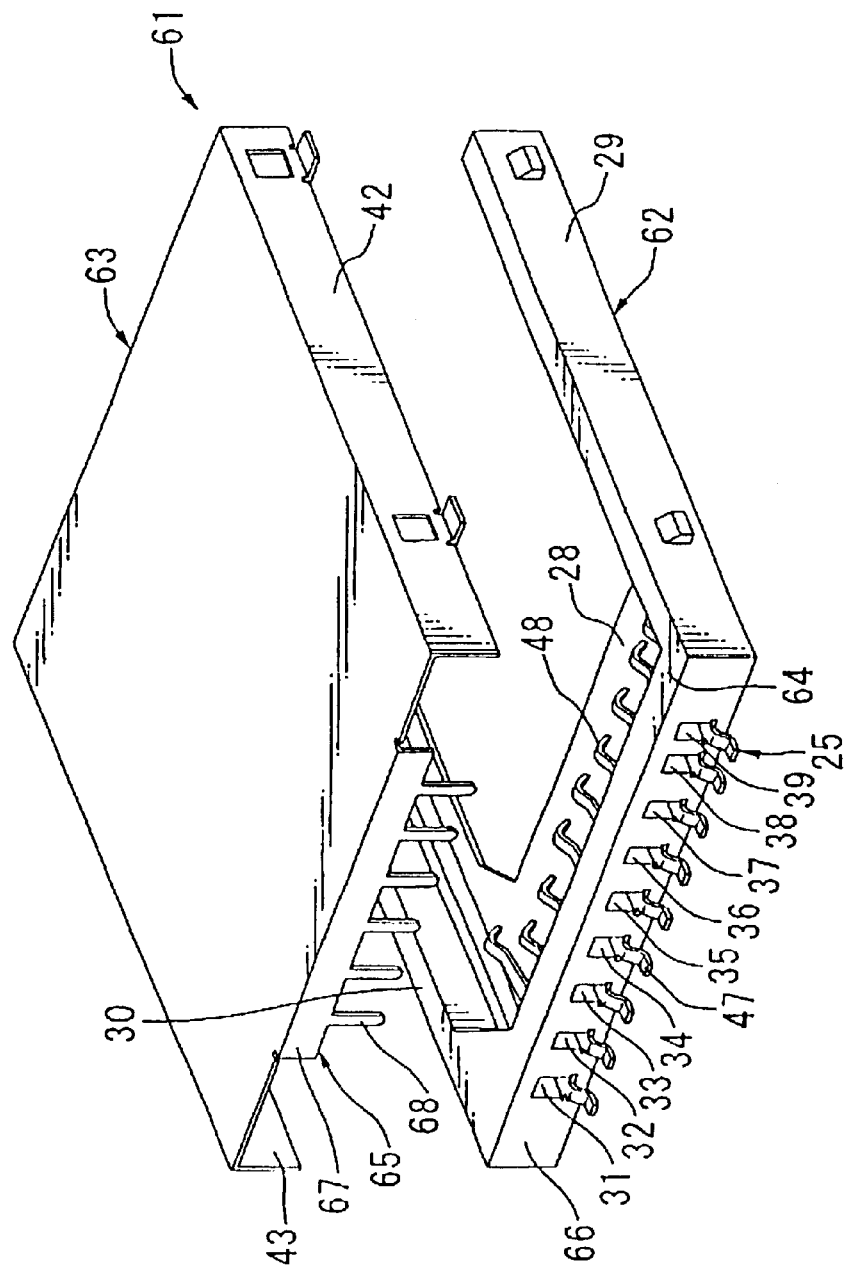
FIG. 4 is an exploded perspective view of the card connector according to the second embodiment of the present invention.
Figure 5:
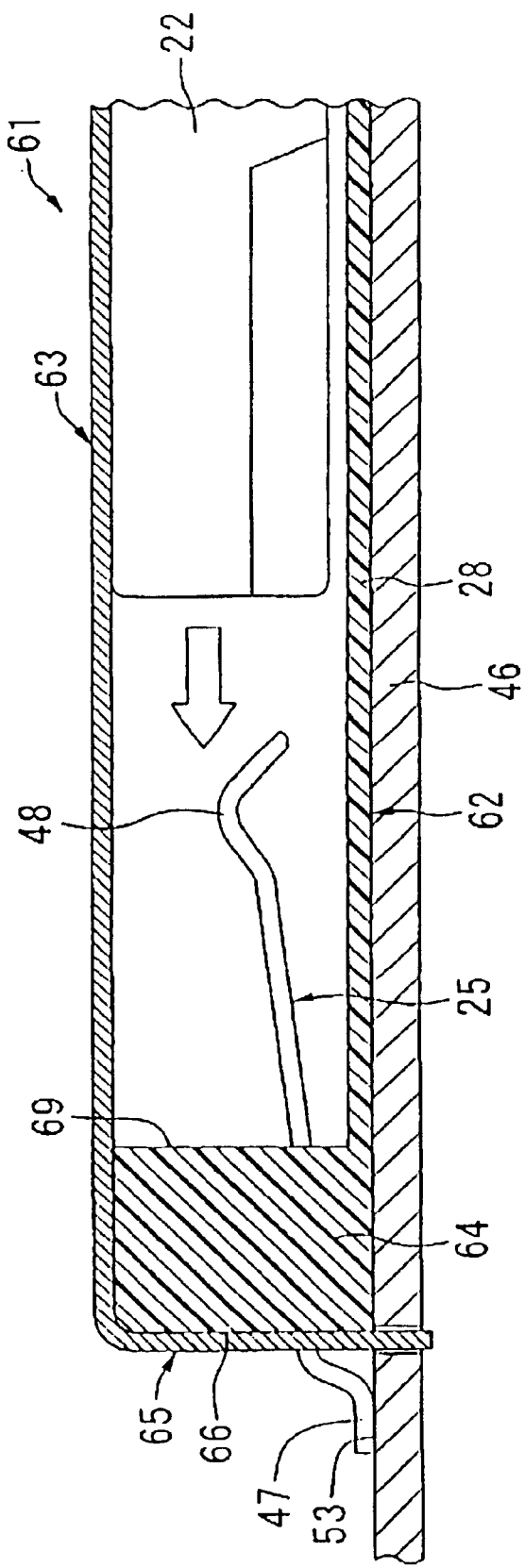
FIG. 5 is a sectional view of a part of the card connector according to the second embodiment of the present invention.

In the second embodiment shown in FIGS. 4 and 5, the same reference numbers are used for the same elements as those of the first embodiment.

A card connector 61 comprises a housing 62 for accommodating the card 22, a housing cover 63 for covering the housing 62, and a plurality of or nine of terminals 25 arranged in the housing 62.

The housing 62 is made of a plastic and comprises a bottom plate 28, a front wall 64 provided at the front end of the bottom plate 28, and side walls 29 and 30. The same number or nine of the through-holes 31–39 as that of the terminals 25 are provided in the front wall 64 in the back-and-forth direction.

The housing cover 63 is made of a metal and has a front end portion 65 bent downwardly to contact with a front surface 66 of the front wall 64, and side ends 42 and 43 bent downwardly. The front end portion 65 comprises an end rail 67 and a plurality of or six legs 68 extending downwardly from the end rail 67. Each of the legs 68 extends between the adjacent two terminals 25 except for the outermost terminals 25, and a lower end of the leg 68 is soldered to the circuit board 46. The legs 68 are preferably soldered to the circuit board 46 between an inner surface 69 of the front wall 64 and the connection section 53, at which the terminal 25 is connected to the circuit board 46. Accordingly, the front end portion 65 functions in the same manner as that of the reinforcing metal 26 in the first embodiment. Even if the electronic device with the card 22 is dropped and the card 22 is excessively pushed into the housing 23, there is no danger that the front wall 64 is broken or the connection section 53 is peeled off because the forward movement of the card 22 is limited by the front end 65.

The lower ends of the legs 50 and 68 in the first and second embodiments may be surface-mounted on the circuit board 46. Also, any connection method other than soldering, such as press-fitting may be employed.

Figure 6:
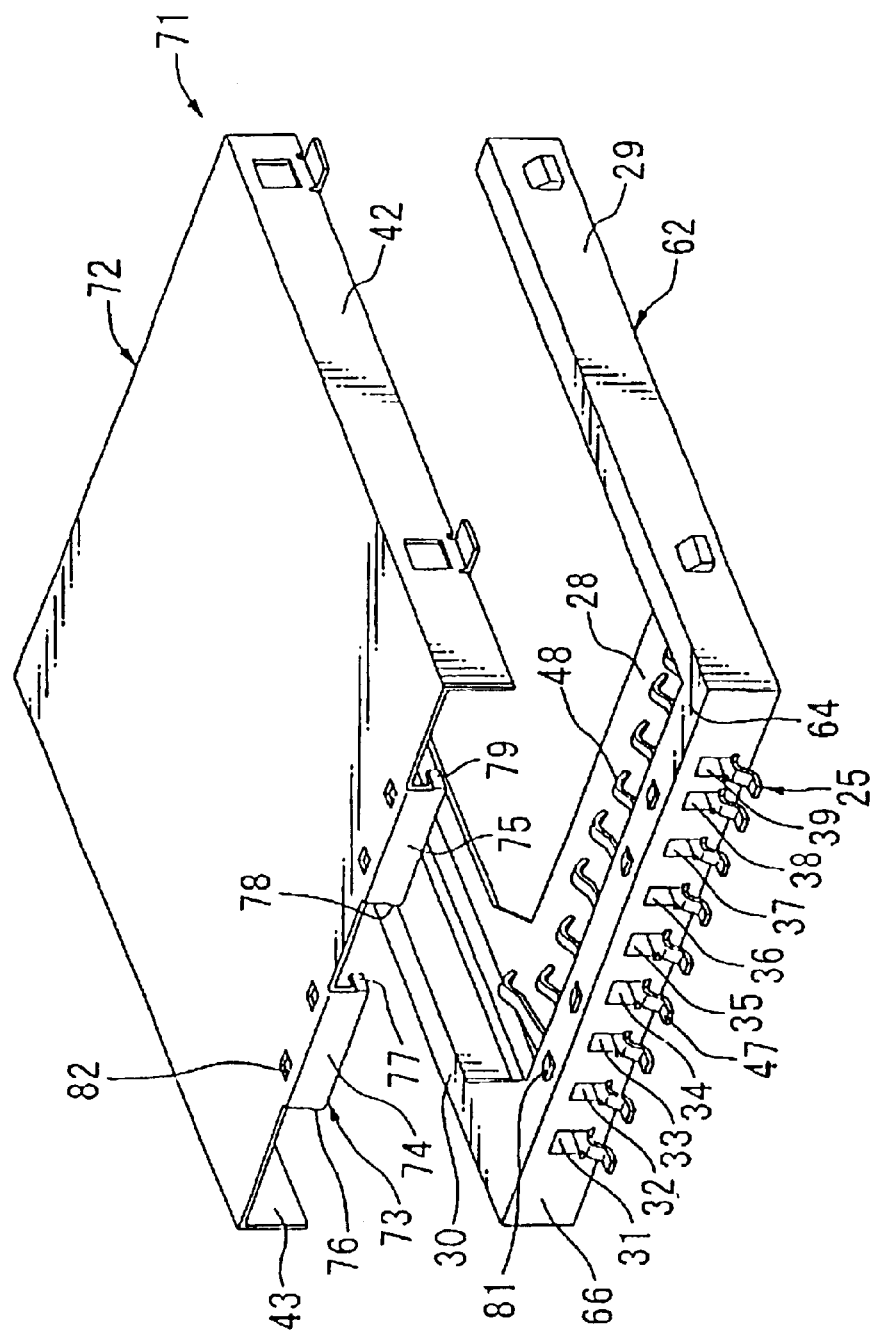
FIG. 6 is an exploded perspective view of the card connector according to the third embodiment of the present invention.
Figure 7:
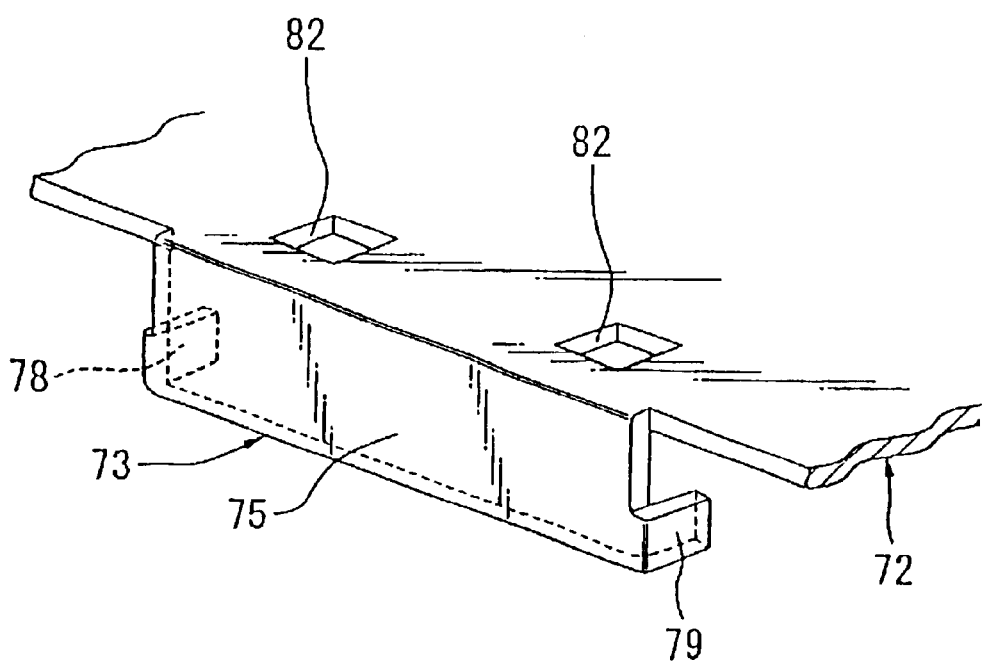
FIG. 7 is an enlarged view of a part of the card connector according to the third embodiment of the invention.
Figure 8:
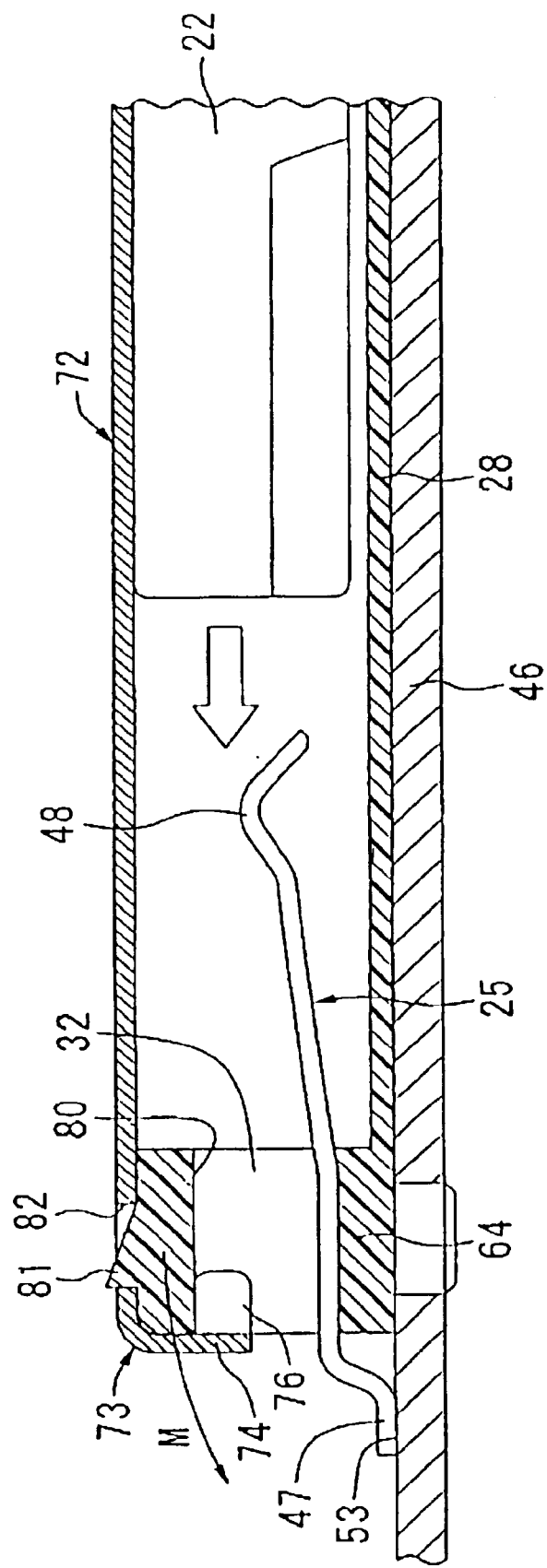
FIG. 8 is a sectional view of a part of the card connector according to the third embodiment of the present invention.
Figure 9:
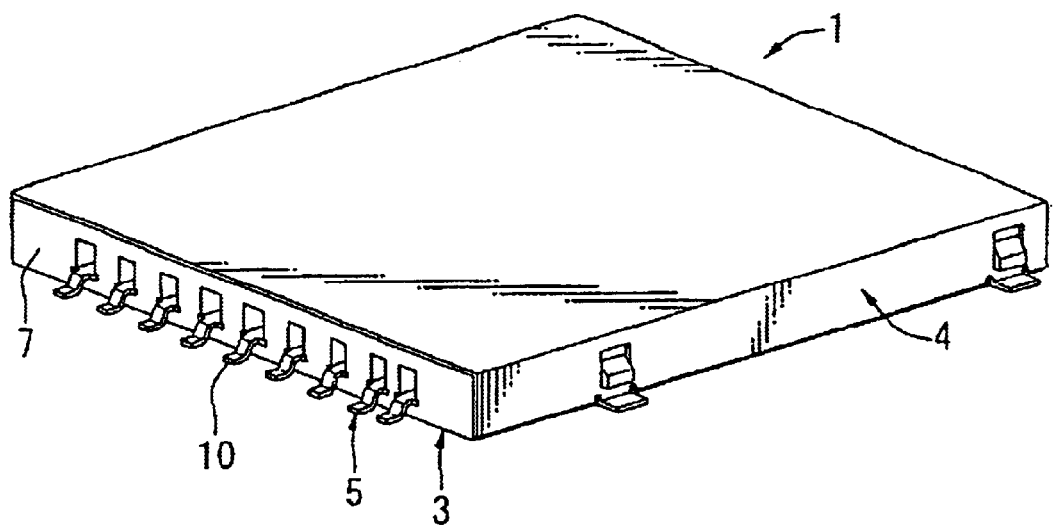
FIG. 9 is a perspective view of a card connector according to the prior art.
Figure 10:
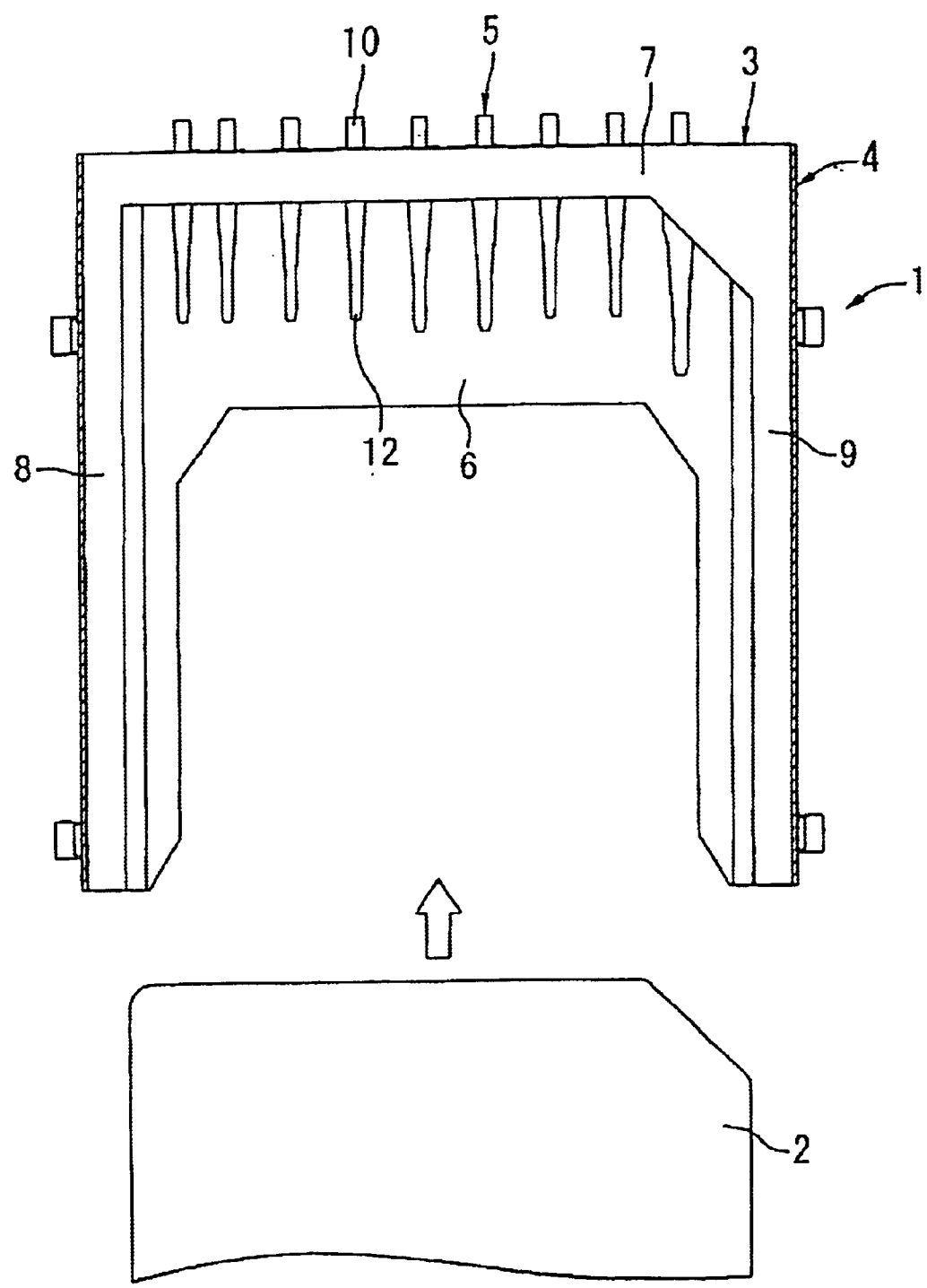
FIG. 10 is a sectional plan view of the card connector according to the prior art.
Figure 11:
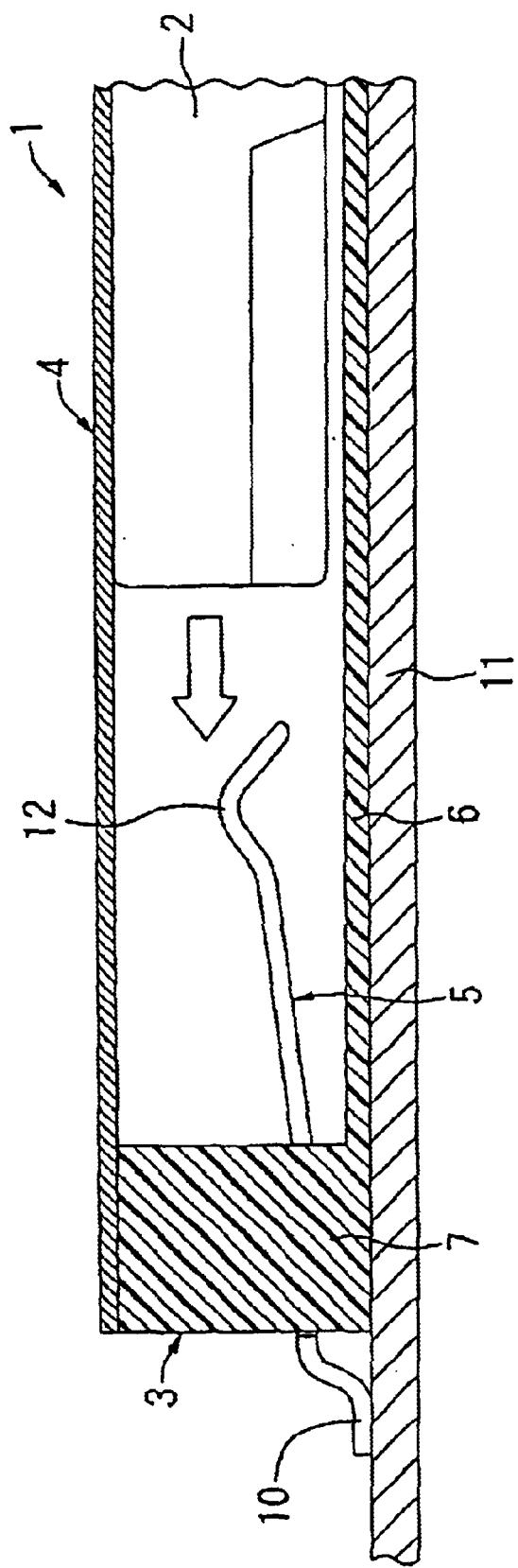
FIG. 11 is a sectional view of a part of the card connector according to the prior art.

In the third embodiment shown in FIGS. 6–8, the same reference numbers are used for the same elements as those of the first and second embodiments.

A card connector 71 comprises a housing cover 72 having a front end portion 73, which has a different shape from the front end portion 65 of the housing cover 63 in the second embodiment. The front end portion 73 comprises two end rails 74 and 75 which contact with the front surface 66 of the front wall 64. Both sides of the end rails 74 and 75 are bent rearwardly to provide engaging pieces 76 and 77, and 78 and 79, respectively. As best shown in FIG. 8, the engaging pieces 76, 77, 78, and 79 enter the through-holes 32, 34, 36, and 38, respectively, and engage with upper surfaces 80 of the through-holes 32, 34, 36, and 38. Accordingly, the housing cover 72 is fixed to the housing 62 at a predetermined position accurately and firmly, and the strength of the front wall 64 is reinforced.

It is preferable that a predetermined number of or four engaging projections 81 are provided on an upper surface of the front wall 64 of the housing 62, and engaging holes 82 are provided in the housing cover 72 at positions corresponding to the engaging projections 81. When the housing cover 72 is fixed to the housing 62, the engaging projections 81 and the engaging holes 82 engage with each other to prevent damage of the front wall 64. Accordingly, even if the card 22 is pushed into the housing 62 excessively, the front wall 64 can withstand the moment M by the engagement between the engaging projections 81 and the engaging holes 82, thus preventing the front wall 64 from being broken.

In the first, second, and third embodiments, the number and the position of the reinforcing metals 27, the legs 68 of the front end portion 65, and the engaging pieces 76, 77, 78, and 79 of the front end portion 73 are not limited to those of the above description. Also, the reinforcing metals 27 and the front ends portions 65 and 73 may be installed at the inner surfaces 52 and 69 of the front wall 64 or different positions of the front wall 64.

The terminal 25 may be accommodated inside the housing 23 and 62 instead of going through the front wall 26 and 64 of the housing 23 and 62, and the rear end of the terminal 25 may be soldered to the circuit board 64. Even in this case, the reinforcing metal 27, the legs 68, and the engaging pieces 76, 77, 78, and 79 are positioned within the range between the outermost terminals 25.

According to the invention, even when the electronic device with the card is dropped and the card is pushed into the housing excessively, the reinforcing member withstands a force in the forward direction applied to the front wall of the housing so that the front wall is not broken, thus improving the reliability of the product.

What is claimed is:

1. A card connector for electrically connecting a card and a circuit board, comprising:
   a housing having a rear end into or from which said card is inserted or removed;
   a plurality of terminals provided in said housing, each terminal having a first end connected to a surface of said circuit board and a second end brought into contact with a contact of said card; and at least one reinforcing member installed in a front wall of said housing within a range between two outermost terminals and directly soldered to said circuit board so that said reinforcing member withstands a force in a forward direction applied to said front wall.

2. The card connector according to claim 1, wherein said first end of said terminal is connected to said circuit board at a connection section in front of said front wall and said reinforcing member is soldered to said circuit board between an inner surface of said front wall and said connection section.

3. The card connector according to claim 1, which further comprises a housing cover for covering said housing, said reinforcing member installed such that it contacts with said housing cover.

4. The card connector according to claim 1, which further comprises a housing cover for covering said housing, said reinforcing member integrally formed with said housing cover.

5. The card connector according to claim 4, said front wall has a plurality of through-holes into which said reinforcing member is inserted.

6. A card connector for electrically connecting a card and a circuit board, comprising:

a housing having a rear end into or from which said card is inserted or removed;

a plurality of terminals provided in said housing, each terminal having a first end connected to a surface of said circuit board and a second end brought into contact with a contact of said card; and a housing cover for covering said housing, said housing cover including a reinforcing member provided at a front edge if a front wall thereof, said reinforcing member having an end rail with a plurality of legs extending downwardly from said end rail and directly soldered to said circuit board within a range between two outermost terminals so that said reinforcing member withstands a force in a forward direction applied to said front wall.

7. A card connector for electrically connecting a card and a circuit board, comprising:

a housing having a rear end into or from which said card is inserted or removed and a front wall having a plurality of through-holes in a back-and-forth direction;

a plurality of terminals installed in said housing, each terminal having a first end connected to a surface of said circuit board and a second end connected to a surface of said circuit board and a second end brought into contact with a contact of said card; and a housing cover for covering said housing, said housing cover including at least one reinforcing member provided at a front edge thereof, said reinforcing member having an end rail with a pair of tabs at both sides thereof extending rearwardly so as to be inserted into said through-holes of said front wall of said housing so that said reinforcing member withstands a force in a forward direction applied to said front wall.

8. The card connector according to claim 7, wherein said terminals are press-fitted into said through-holes of said front wall of said housing.

* * * * *